United States Patent [19]

Henderson

[11] Patent Number: 5,019,197
[45] Date of Patent: May 28, 1991

[54] METHOD OF MAKING COMPOSITES HAVING LAYERS OF THE SAME OR DIFFERENT FIRMNESS

[76] Inventor: Lionel A. Henderson, 433 Charleston Ave., Columbus, Ohio 43214

[21] Appl. No.: 267,825

[22] Filed: Nov. 7, 1988

[51] Int. Cl.$^5$ .................. B32B 31/20; B32B 31/28
[52] U.S. Cl. ................... 156/212; 156/221; 156/242; 156/272.4; 156/307.3; 264/25; 264/241; 264/248; 264/257
[58] Field of Search ............... 156/242, 246, 272.4, 156/307.5, 307.3, 196, 212, 221; 264/22, 25, 27, 79, 520, 239, 241, 248, 257

[56] References Cited

U.S. PATENT DOCUMENTS

| | | | |
|---|---|---|---|
| 3,269,887 | 8/1966 | Windecker | 156/242 |
| 4,051,296 | 9/1977 | Windecker | 156/246 |
| 4,477,707 | 10/1984 | Kim | 156/272.4 |

*Primary Examiner*—Merrell C. Cashion, Jr.

[57] ABSTRACT

Composites having one or more layers of the same or different firmness and comprising one or more similar or dissimilar layer materials are made by impregnating at least one of the originally soft layer materials separately, each with a similar or dissimilar resin containing optional additives (e.g., pigments, dyes, light reflective modifiers, smoke suppressants, fire retardants, acoustical modifiers, EMF barriers, antifoaming agents, etc.), and curable to a soft or hard polymer and, optionally, or when necessary to sufficiently inhibit formation of hard lumps in the soft layer materials by the hard resins, partitioning the resinated layer materials by hot melt films which may also act as adhesives and contacting the resinated layer materials in such a way that the resin of one layer will contact at least one different layer and compressing the contacted resinated layers, optionally along with decorative covering for one or both surfaces, to the desired planar or three-dimensional configuration and curing, optionally along with ornamentals and fasteners or other hardware to be attached, to the integral composite.

These methods may be tailored to obtain flexible and rigid composites having opposing surfaces of approximately equal or considerably unequal firmness and which are normally covered with a decorative material.

7 Claims, 1 Drawing Sheet

METHOD OF MAKING COMPOSITES HAVING LAYERS OF THE SAME OR DIFFERENT FIRMNESS

SUMMARY OF THE INVENTION

Background of the Invention

Layered composites having at least one soft face and optionally a firm backing to ensure a relatively rigid configuration are well known. They have long been either made by foam-in-place techniques or, especially for rigid articles, generally hand fabricated by attaching a soft decorative cover to a rigid backing layer (e.g., plastic sheet, compressed resinated fiberglass, wood or paper board, metal, etc.).

Properly attaching a soft layer to a more three-dimensional rigid backing becomes increasingly more difficult. Thus, compression and vacuum assist techniques have been used to aid in these more three-dimensional coverings.

Recently developed technologies have included heating thermoplastic foams, optionally covered with a foam-backed decorative cover, to softening temperatures and compressing in a cold mold to stiffen the article and attain the desired shape.

OBJECT OF THE INVENTION

One object of the invention is to provide rigid layered integral composite articles, especially of planar and three-dimensional configuration, self-supporting without a solid hard backing layer, comprising similar or dissimilar layer materials and having opposite broad surfaces of either approximately equal or considerably unequal firmness essentially completed in a single molding or press-closing curing procedure.

A second objective is to provide methods for manufacture of the articles. One method comprises impregnating a porous layer material member, preferably fiber, with about one to three times its weight of hard resin (i.e., a resin curable to a hard substance) optionally formulated to contain functional additives (e.g., fire retardants, EMF barriers, etc.) and decorative additives (e.g., pigments, light reflective modifiers, etc.), then compressing the hard-resinated layer to the desired planar or three-dimensional shape and curing. A second method comprises layering the hard-resinated member with one of its broad surfaces in contact with the back of a cover member, optionally adhered to a soft backing, or sandwiching the hard-resinated member between two cover members, then compressing and curing). A third method comprises impregnating one (or more) of a second similar or dissimilar member with a similar or dissimilar soft or hard resin, inserting the second resinated member(s) between the cover(s) and the hard-resinated member, compressing to the desired configuration and curing.

A third objective is to provide an advantageous means for curing the articles. The means for curing involves compressing the resinated layer members in silicone molds and curing the resins in a dielectric field. This method affords cure times of less than 60 seconds, permitting high production rates, and allows concomitant attachment of ornamentals and hardware (e.g., fasteners) to the articles.

A fourth objective is to provide a means for preventing hard resins from penetrating far enough either into a decorative cover to cause a blemished appearance or into a soft layer member far enough to cause lumpy, hard protrusions under the soft surface.

Resins curable to soft polymers shall subsequently be described as soft resins; those curable to hard polymers shall be described as hard resins.

The use of a soft cover or layer material, alone or impregnated with a soft resin, in contact with a hard resin in a backing layer material often results in a cured composite article with a blemished cover or soft face which feels lumpy under the surface after curing due to interpenetration of the resin into the cover or soft layer. When the hard resin being used is subject to gassing or foaming, the use of antifoam agents in the resin formulation will often inhibit the resultant lump formations. The problem of hard lumps or interpenetration of the hard resin may also be prevented or inhibited by either allowing the resins to cure to a high enough viscosity to not flow freely, or, when necessary, by sandwiching a layer of hot melt film between the cover or soft layers and the hard-resinated materials before pressing and heat curing.

The hot melt film should have a softening-melting temperature range at least sufficiently high to afford a delay to allow the hard resin to reach a viscosity high enough to not flow easily, yet not be totally cured, thus able to bond to other layer materials.

Simply allowing time for the hard resin to cure to a sufficiently high viscosity often makes it unnecessary to use a hot melt film. Timing for the proper viscosity may, however, require considerable trial and error and it may be more simple to use a hot melt film.

The hot melt film may or may not be adhesive to the soft and/or hard resin but should disintegrate by shrinkage and/or melting to allow sufficient contact of the cover or soft layer or incompletely cured soft and hard resins in order to obtain a more complete bond between them.

The use of the same resin in each of the layer materials, whether the layer materials are similar or dissimilar, normally does not require preventing interpenetration of the resins during compression and curing.

It is to be understood that similar and/or dissimilar hard and soft resins include those of the same or different chemical family types (e.g., polyurethanes, epoxies, phenolics, unsaturated polyester resins, polyurethane-unsaturated resin hybrids, epoxy-urethane blends, etc.) and resins within any one of the chemical families which are curable to polymers of different firmness.

Similar and/or dissimilar layer materials include closed cell and open cell foams (e.g., polyether and polyester polyurethanes, polyethylene, etc.), woven and nonwoven fibers (e.g., polyester, nylon, jute, fiberglass, coconut fibers, wood fibers, hemp, etc.), or their combinations or blends. These materials may optionally be pretreated with finishes which enhance wetting out and adhesion to the soft and hard resins before and after curing, thus resulting in a higher impact resistant and more durable article. The layered composite articles may optionally include reinforcing materials (e.g., mesh netting, spun bond scrims, paper, fiber glass layer, metal screen, etc.), sandwiched between layers or used as a backing. The completed layered composites normally include a decorative cover (e.g., woven or nonwoven fabrics, vinyl materials, decorative papers, etc.). The cured composite may include various embossed face designs (e.g., sharp down lines, simulated stitched or sewn lines); they may also include molded-in hardware and ornamentals (e.g., mylar or vinyl simulated chrome strips) and molded-in fasteners (e.g., metal toy tabs, conical tree-type fasteners, plastic fasteners, etc.).

The following combinations of layers are representative examples of those which have been used to make layered composites by the methods of this invention:

I.

Layer 1. fabric flame-laminated to a
Layer 2. soft PU foam over a hot melt film over a
Layer 3. of soft PU foam impregnated with a hard PU resin.

II.

Layer 1. fabric flame-laminated to a
Layer 2. of soft PU foam over a hot melt film over a
Layer 3. of soft PU foam impregnated with a hard PU-unsaturated polyester hybrid resin.

III.

Layer 1. fabric flame-laminated to a
Layer 2. of soft polyester fiber layer over a hot melt film over a
Layer 3. of soft PU foam impregnated with hard epoxy resin.

IV.

Layer 1. fabric flame-laminated to a
Layer 2. of soft PU foam over a
Layer 3. of soft PU foam impregnated with hard PU resin and by waiting to partially cure the hard PU resin.

V.

Layer 1. fabric flame-laminated to a
Layer 2. of soft PU foam over a
Layer 3. of soft PU foam impregnated with hard epoxy resin and waiting to partially cure the hard epoxy resin.

VI.

Layer 1. decorative fabric over hot melt film over
Layer 2. of soft PU foam impregnated with soft PU resin over hot melt film over
Layer 3. of nonwoven polyester fiber impregnated with hard PU resin.

VII.

Layer 1. decorative fabric over hot melt film over
Layer 2. of soft PU foam impregnated with soft PU resin over hot melt film over
Layer 3. nonwoven polyester-nylon fiber blend impregnated with hard PU resin.

VIII.

Layer 1. fabric flame-laminated to a
Layer 2. of soft PU foam over
Layer 3. nonwoven jute fiber impregnated with hard unsaturated polyester resin.

IX.

Layer 1. decorative fabric over hot melt film over
Layer 2. of nonwoven polyester fiber impregnated with hard PU resin.

X.

Same as IX except mylar chrome strips were dielectrically bonded to the face goods and metal fasteners were molded into the backing.

Preferred combinations are those including open cell PU foams optionally impregnated with soft resin as the soft face material with nonwoven fibers of polyester, polyester-nylon, or jute impregnated with hard PU resin as the rigid back material using, as necessary, hot melt films to inhibit interpenetration of the hard resin into the soft face layer material.

UTILITY OF THE INVENTION

The utility of the invention includes the fabrication of layered composite flexible and rigid formed articles for furniture and for interior decorative interior trim used in the transportation, agricultural, and recreational vehicles and in building construction trades. More specific uses include headliners, door panels, trunkliner panels, floor panels, door post panels, sail panels and seating panels for automotive, trucking, aircraft, boating, agricultural and other off road vehicles, decorative room divider panels for office and housing, panels for segmenting office and computer work stations and other uses for formed panels. It is obvious that with the knowledge of the requisite salient features and specifications, the methods of the invention can be modified as desired to include the proper materials and resin additives such as pigments, dyes, acoustical modifiers, fire retardants, smoke suppressants, impact modifiers, EMF barriers, etc., in order to tailor the panels for end use applications.

ADVANTAGES OF THE INVENTION

The more obvious advantages of the present invention include the following:

1. Less labor intensive; essentially complete formed panels with flush cut or pinch-sealed cut edges, decorative covers, face ornamentals, molded-in hardware and fasteners, and desired combinations of soft or firm faces and layer materials to give the desired flexibility or rigidity obtained in a one-stage mold-curing or press closing procedures.

2. Lower energy process; essentially a resin-mat-molding process requiring low pressure presses and relatively low temperature curing.

3. Less expensive tooling (e.g., birch wood laminate molds with mounted die ruling, lower cost cast molds, lay-up, silicone and dielectric molds versus more expensive extrusion molds for preformed plastic sheet-type rigid backing layers).

4. More versatile; articles range from soft, suitable for trim padding, to semi-firm, suitable, e.g., for headliners, to firm, suitable, e.g., for self-supporting, rigid backed door panels and side panels, etc., and similar or dissimilar resins, similar or dissimilar layer materials and possible tailoring of resins and materials to include additives (e.g., smoke suppressants, fire retardants, EMF barriers, etc.).

5. Improved sound absorption; use of open cell and fiber materials especially with PU resins allows more trapping and deadening of sound waives. Self-destructing hot melt films dissipate, leaving the panel more open and sound absorptive.

6. Deep, sharp corner contours by use of hot melt films and tenor frames.

7. Higher impact strength by use of selected hard resins and woven and nonwoven fiber materials.

8. Light weight; an ABS-backed door panel area weighs approximately twice that of the equivalent made by this method.

Figure 1:
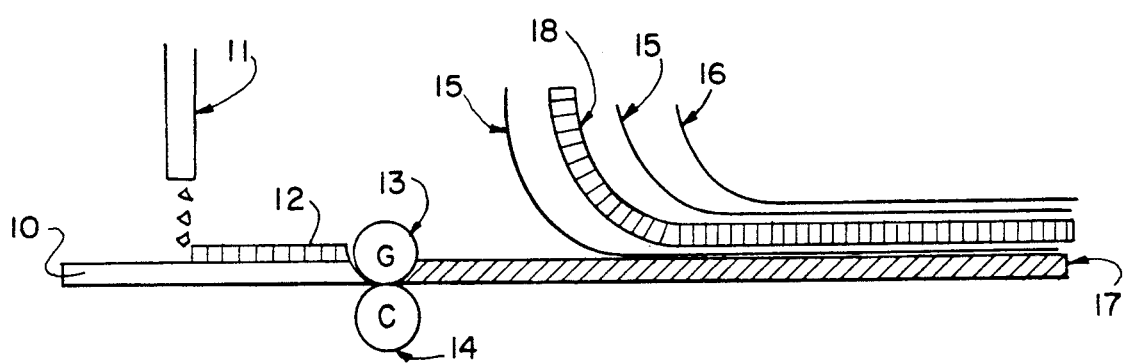
FIG. 1 is a Schematic of a Method for Applying Resin.

10. Layer material (e.g., foam, fiber)
11. Dispenser for applying resin
12. Resin
13. Roller to contact and impregnate resin
14. Back roller
15. Hot melt film
16. Decorative cover with soft foam back
17. Layer material impregnated with resin
18. Soft layer material optionally attached to decorative cover or optionally impregnated with hard or soft resin and partitioned as necessary using hot melt films.

Figure 2:

FIG. 2 shows the Cured Layer Integral Composite.

DETAILED DESCRIPTION OF THE INVENTION

The procedures and techniques for fabrication and curing of adhesively bonded layered composites are fairly common knowledge of the art and need not be comprehensively detailed. However, a detailed description of a method amenable to the drawings is given in order to note especially preferred embodiments.

FIG. 1. by profile illustrates a method of applying a resin (12) and optional additives and modifiers from a dispenser (11) onto a layer material (10) which is then drawn through a set of rollers (13) and (14) which partially or totally impregnates the resin (12) into the layer material (10). When the resin (10) is a hard resin, the resultant resin-impregnated layer material (17) may be allowed to cure to a state where the resin is fairly tacky to touch and/or, optionally as needed, a hot melt film (15) is placed on (17), a decorative fabric cover (16) optionally bonded to a soft layer material (18) is placed over the preceding layers and the layered materials are then placed in a planar or three-dimensional mold and cured. The soft layer material (18) may be separate and may be partitioned from (16) and/or (17) by hot melt films and may be partially or totally impregnated with a hard or soft resin.

Preferred layer materials (10) are open cell PU foams, polyester fibers, nylon fibers, polyester-nylon fiber blends, and jute fibers and corona treated polypropylene fibers. Especially preferred are polyester and nylon fibers or their blends with or without finishes which enhance wetting out and adhesion or bonding with the resins.

Preferred resins (12) are soft and hard PU resins. There are many hard and soft PU resin formulations possible to those skilled in the art. Other preferred hard resins are PU-unsaturated polyester hybrids (e.g., Arimax resins [Ashland Chemical Corp.], epoxy resins [many sources, e.g., Dow Chemical Corp.], unsaturated polyester resins, especially those with thickening agents as in sheet molding compound formulations [many sources, e.g., Ashland Chemical Corp.]).

Hot melt films (15) used when necessary may be any which will shrink, melt and/or disintegrate at temperatures above the fabrication temperature and below a temperature at which at least one of the resins used is yet incompletely cured, enabling it to bond chemically with the other resin or soft layer material (18). Especially preferred are those which also act as hot melt adhesive films (e.g., films of proprietary formulations from, e.g., Dow Chemical Corp.).

I claim:

1. A method for making composites having layers of the same or different firmness which comprises:
   a. providing a porous soft layer material selected from the group consisting of fiber and open cell polyurethane foam;
   b. impregnating said porous soft layer material with about one to five times its weight in curable resin;
   c. sandwiching a layer of hot melt film between said resin impregnated material and a second layer of material;
   d. simultaneously curing the resin in said resin impregnated soft layer and shaping the assembled layers in a mold to form a rigid composite.

2. The method as claimed in claim 1 wherein said resin is cured by compressing the resin-impregnated layer material between two polymeric material layers while applying an electric current to create an electromagnetic field which causes the resin to heat and accelerates polymerization and curing and removing the cured composite from between the polymeric material layers.

3. The method as claimed in claim 2 wherein the polymeric material comprises a silicone polymer.

4. The method as claimed in claim 1 wherein the resin includes additives selected from the group consisting of pigments, dyes, light reflective modifiers, smoke suppressants, acoustical modifiers, mineral fillers, and hollow sphere materials.

5. The method as claimed in claim 1 wherein the resin-impregnated layer material member is further contacted on at least one broad surface with at least one serially built up combination selected from the group consisting of:
   (a) a cover member
   (b) a hot melt film under a cover member
   (c) a soft layer material under an adhesive under a cover member
   (d) a hot melt film under a soft layer material under an adhesive under a cover material
   (e) a resin-impregnated layer material under a cover member
   (f) a hot melt film under a soft resin-impregnated layer material under a cover member
   (g) a hot melt film under a resin-impregnated layer material under a hot melt film under a cover member 6. The method as claimed in claim 5 wherein the fiber is selected from the group consisting of polyester nylon, jute, rayon, coconut, wood, hemp, polypropylene, glass, and their blends.

7. The method as claimed in claim 5 wherein the resin is selected from the group consisting of phenolic, unsaturated polyester, epoxy, acrylic, silicone, polyurethane, latex, synthetic rubber, and their blends.

* * * * *